(12) United States Patent
Wu et al.

(10) Patent No.: US 11,281,264 B2
(45) Date of Patent: Mar. 22, 2022

(54) POWER SUPPLY BUS APPARATUS AND SERVER HAVING SAME

(71) Applicant: GIGA-BYTE TECHNOLOGY CO., LTD., New Taipei (TW)

(72) Inventors: Chun-Liang Wu, New Taipei (TW); Ching-Chuan Huang, New Taipei (TW); Chao-Hsiang Huang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 137 days.

(21) Appl. No.: 16/361,248

(22) Filed: Mar. 22, 2019

(65) Prior Publication Data
US 2019/0369680 A1 Dec. 5, 2019

(30) Foreign Application Priority Data
Jun. 1, 2018 (TW) ................................ 107119079

(51) Int. Cl.
| G06F 1/26 | (2006.01) |
| G06F 1/18 | (2006.01) |
| G06F 1/32 | (2019.01) |
| G06F 1/3234 | (2019.01) |

(52) U.S. Cl.
CPC .............. *G06F 1/189* (2013.01); *G06F 1/185* (2013.01); *G06F 1/186* (2013.01); *G06F 1/26* (2013.01); *G06F 1/3253* (2013.01)

(58) Field of Classification Search
None
See application file for complete search history.

(56) References Cited

U.S. PATENT DOCUMENTS

| 10,944,289 B2* | 3/2021 | Calvin | H02J 13/00002 |
| 2011/0136353 A1* | 6/2011 | Spitaels | H01B 7/30 |
| | | | 439/95 |
| 2016/0043555 A1* | 2/2016 | Howell | H02J 9/062 |
| | | | 307/23 |
| 2017/0119219 A1* | 5/2017 | Pelfrey | A47K 5/1217 |

FOREIGN PATENT DOCUMENTS

| CN | 102934041 A | 2/2013 |
| TW | 201314417 A1 | 4/2013 |
| TW | 201317759 A1 | 5/2013 |

* cited by examiner

*Primary Examiner* — Fahmida Rahman
(74) *Attorney, Agent, or Firm* — Idea Intellectual Limited; Margaret A. Burke; Sam T. Yip

(57) ABSTRACT

A power supply bus apparatus and a server having the same are provided. The power supply bus apparatus is suitable for electrically connecting to a power supply module, and includes a first power supply backplane, a first docking structure, and an electrical bus insertion group. The first docking structure is disposed on the first power supply backplane and docked with the power supply module. The electrical bus insertion group is disposed on the first power supply backplane, the electrical bus insertion group includes a first insertion structure and a second insertion structure, and the second insertion structure has a polarity different from that of the first insertion structure.

17 Claims, 3 Drawing Sheets

POWER SUPPLY BUS APPARATUS AND SERVER HAVING SAME

CROSS-REFERENCE TO RELATED APPLICATION

This non-provisional application claims priority under 35 U.S.C. § 119(a) to Patent Application No. 107119079 filed in Taiwan, R.O.C. on Jun. 1, 2018, the entire contents of which are hereby incorporated by reference.

BACKGROUND

Technical Field

The present invention relates to a power supply bus apparatus, and in particular, to a power supply bus apparatus suitable for a computing host, and a server having the same.

Related Art

With development of science and technologies, use of computers is already an indispensable condition in life in the present society.

Most power supply modules used in servers on the current market have fixed specifications, for example, a fixed electricity quantity and a fixed size. Therefore, when a person in the industry designs specifications of a server, the specifications are often subject to specifications of a power supply module. When flexible application is impossibly achieved, higher-order accessories are inevitably reduced or removed. For example, when a power supply module has a low wattage, a high-order accessory with high energy consumption is removed.

Correspondingly, if a common server with an accessory having medium-order specifications is installed with a high-wattage power supply module, only manufacturing costs are increased when the fixed specifications cannot be flexibly changed.

SUMMARY

At least one embodiment of the present invention provides a power supply bus apparatus, suitable for electrically connecting to a power supply module. The power supply bus apparatus includes a first power supply backplane, a first docking structure, and an electrical bus insertion group. The first docking structure is disposed on the first power supply backplane and docked with the power supply module. The electrical bus insertion group is disposed on the first power supply backplane, the electrical bus insertion group includes a first insertion structure and a second insertion structure, and the second insertion structure has a polarity different from that of the first insertion structure.

In an embodiment, the power supply bus apparatus further includes a second power supply backplane, a second docking structure, and a pin element. The second docking structure is disposed on the second power supply backplane. Two ends of the pin element are respectively electrically connected to the first power supply backplane and the second power supply backplane.

In an embodiment, in the power supply bus apparatus, the pin element includes a first clamping slot, an electrical connection board, and a second clamping slot. The first clamping slot is provided on the first power supply backplane, the second clamping slot is provided on the second power supply backplane, and two sides of the electrical connection board are respectively clamped in the first clamping slot and the second clamping slot.

In an embodiment, in the power supply bus apparatus, the first insertion structure includes a first base and a first plug, the first base is disposed on a surface of the first power supply backplane, the first plug is connected to the first base, the second insertion structure includes a second base and a second plug, and the second plug is connected to the second base.

In an embodiment, in the power supply bus apparatus, the first insertion structure further includes a first lock member and a second lock member, the first base further includes a first lock hole, and the second base further includes a second lock hole. The first lock member passes through the first lock hole to secure the first base on the first power supply backplane, and the second lock member passes through the second lock hole to secure the second base on the first power supply backplane.

In an embodiment, in the power supply bus apparatus, a size of the electrical bus insertion group corresponds to an electricity quantity of the power supply module.

In an embodiment, the power supply bus apparatus further includes a frame body, where the first power supply backplane is disposed in the frame body.

In an embodiment, in the power supply bus apparatus, the frame body includes a cover plate and two side plates. The side plates are respectively disposed on two sides of the first power supply backplane, and the cover plate is located above the first power supply backplane and separately connected to the side plates.

In an embodiment, in the power supply bus apparatus, the cover plate includes a locking hole, and the cover plate is detachably locked to a housing by using a securing member passing through the locking hole.

At least one embodiment of the present invention further provides a server, including the power supply bus apparatus described above and an electrical relay substrate. The electrical relay substrate includes a first insertion hole and a second insertion hole, where the first insertion structure is docked with the first insertion hole, and the second insertion structure is docked with the second insertion hole.

The server further includes a circuit board electrically connected to the electrical relay substrate, to receive electrical energy transmitted by the electrical relay substrate.

The power supply bus apparatus provided in the at least one embodiment of the present invention is installed in the server, and has a structure and a design that are convenient for operations and maintenance. Power supply modules with different power may be docked according to requirements of a system (such as a computing host or the server), so that accessory selection for the system is flexible.

In other words, a person in the industry selects an applicable power supply module based on specifications required by the computing host or the server. A user may also use a high-wattage power supply module for replacement for an equipped high-order accessory, or vice versa. In this way, manufacturing costs can be reduced.

In addition, in an embodiment of the present invention, the power supply bus apparatus is installed in the server, and no wire is used for a docking structure. For the system, wind resistance can be minimized, and heat dissipation can be facilitated.

DETAILED DESCRIPTION

Figure 1:
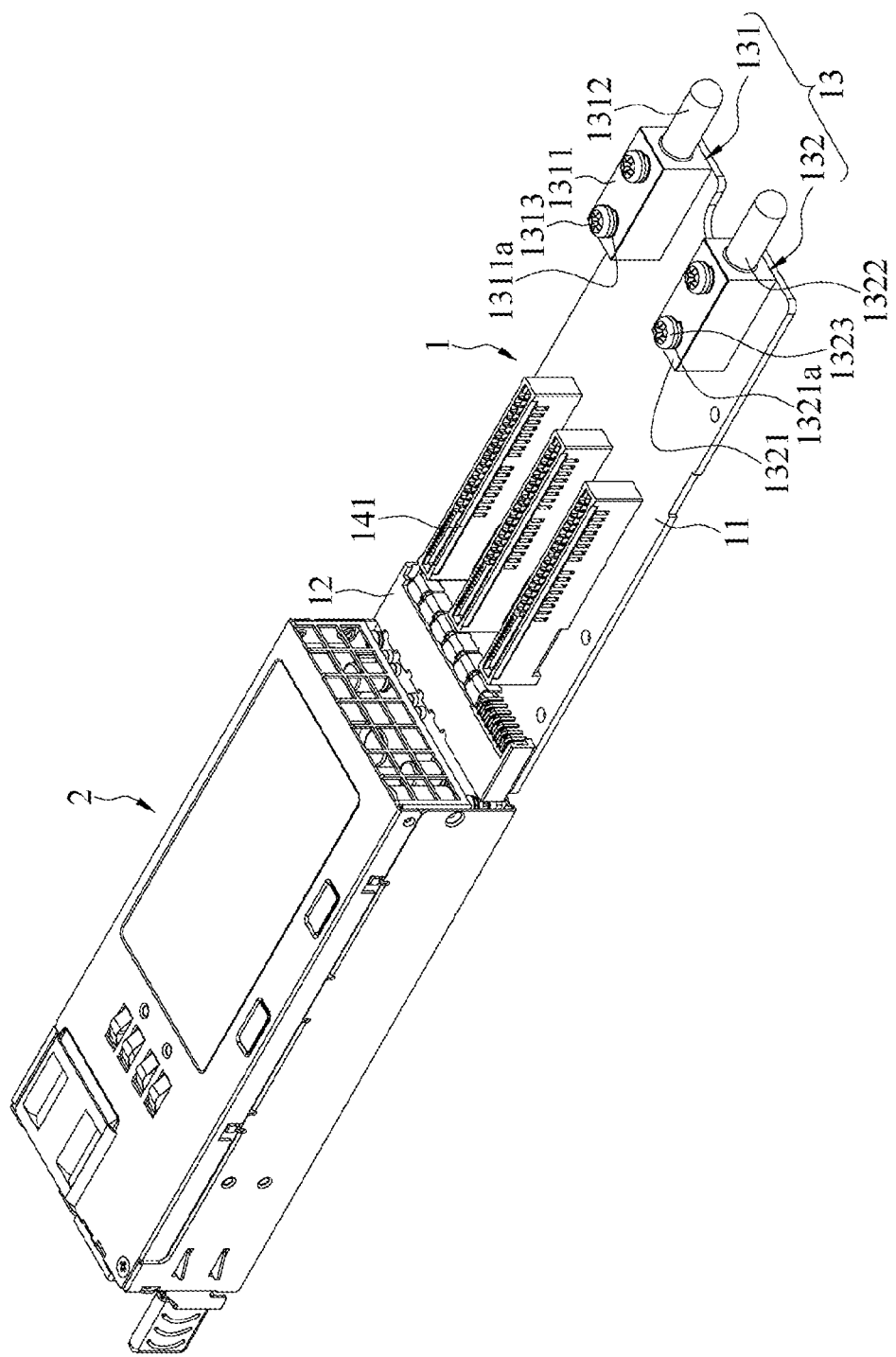
FIG. 1 is a schematic diagram of appearance of a power supply bus apparatus according to a first embodiment of the present invention.

FIG. 1 is a schematic diagram of appearance of a power supply bus apparatus 1 according to a first embodiment of the present invention. The power supply bus apparatus 1 is suitable for electrically connecting to a power supply module 2, and includes a first power supply backplane 11, a first docking structure 12, and an electrical bus insertion group 13.

The first docking structure 12 is disposed on the first power supply backplane 11 and docked with the power supply module 2. There are a capacitive element and another electronic element on the first power supply backplane 11. The first docking structure 12 may be a bus plug or a bus socket, and a docking structure corresponding to the power supply module 2 is a bus socket or a bus plug.

The electrical bus insertion group 13 is disposed on the first power supply backplane 11, the electrical bus insertion group 13 includes a first insertion structure 131 and a second insertion structure 132, and the second insertion structure 132 has a polarity different from that of the first insertion structure 131. The electrical bus insertion group 13 is made of a metal, and in an embodiment, the electrical bus insertion group 13 is made of a copper metal. The polarity of the first insertion structure 131 is different from that of the second insertion structure 132. For example, if the polarity of the first insertion structure 131 is positive, the polarity of the second insertion structure 132 is negative. Correspondingly, if the polarity of the first insertion structure 131 is negative, the polarity of the second insertion structure 132 is positive. The polarities of the two insertion structures are not limited in the present invention.

In this embodiment, the first insertion structure 131 and the second insertion structure 132 are plug structures. The first insertion structure 131 includes a first base 1311 and a first plug 1312, the first base 1311 is disposed on a surface of the first power supply backplane 11, the first plug 1312 is connected to the first base 1311, the second insertion structure 132 includes a second base 1321 and a second plug 1322, and the second plug 1322 is connected to the second base 1321. By using this structure, the electrical bus insertion group 13 may be inserted into a circuit board, to provide electrical energy of the power supply module 2.

Further, in this embodiment, the first insertion structure 131 further includes a first lock member 1313, and the second insertion structure 132 further includes a second lock member 1323. The first base 1311 further includes a first lock hole 1311a, and the second base 1321 further includes a second lock hole 1321a. The first base 1311 is secured on the first power supply backplane 11 by using the first lock member 1313 and the first lock hole 1311a, and the second base 1321 is secured on the first power supply backplane 11 by using the second lock member 1323 and the second lock hole 1321a. The first lock member 1313 and the second lock member 1323 are, for example, screws, and the first lock hole 1311a and the second lock hole 1321a are, for example, holes whose inner walls have a threaded structure.

Figure 2:
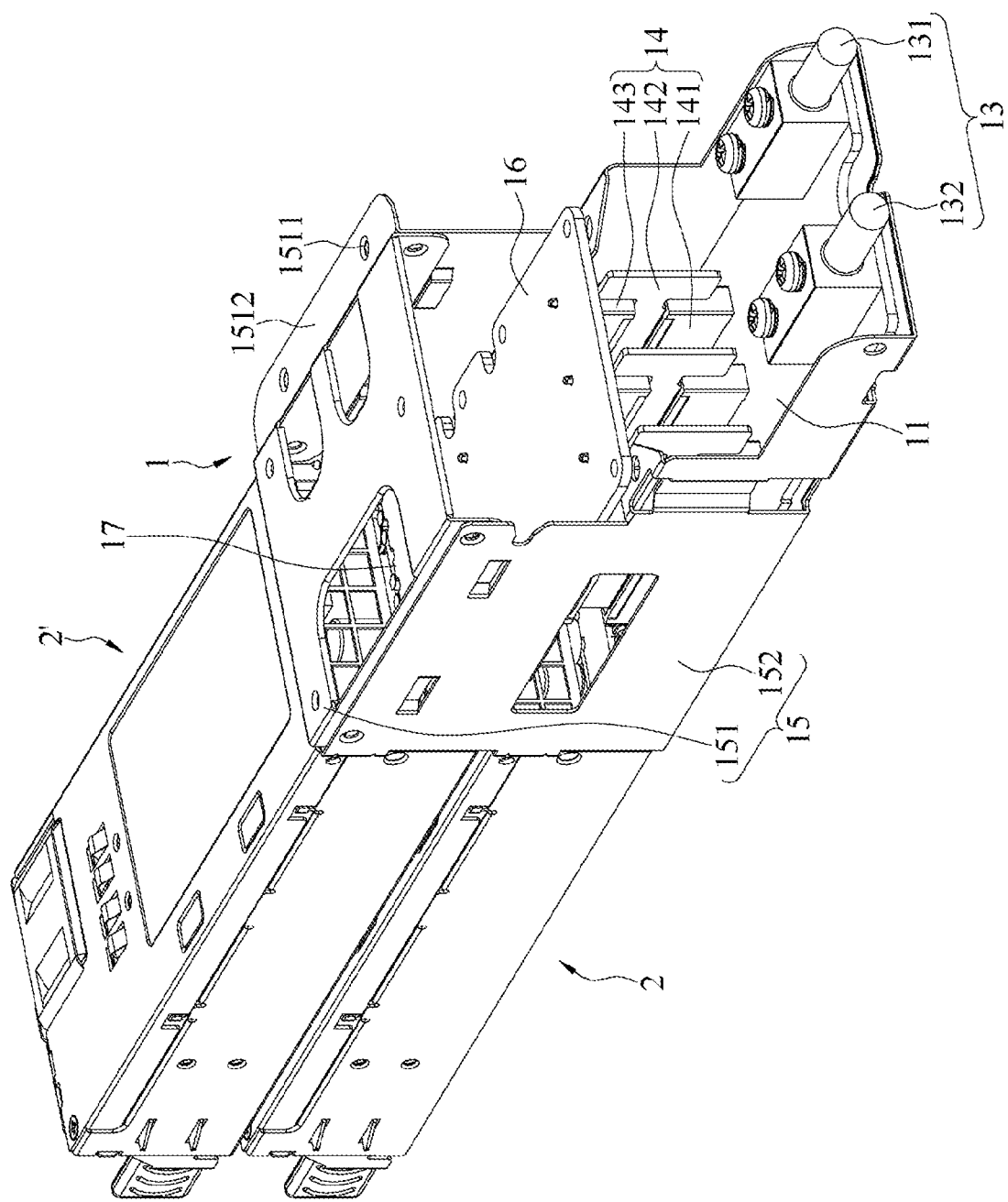
FIG. 2 is a schematic diagram of appearance of a power supply bus apparatus according to a second embodiment of the present invention.

FIG. 2 is a schematic diagram of appearance of the power supply bus apparatus 1 according to a second embodiment of the present invention. The power supply bus apparatus 1 includes a second power supply backplane 16, a second docking structure 17, and a pin element 14. Two ends of the pin element 14 are respectively electrically connected to the first power supply backplane 11 and the second power supply backplane 16. The second docking structure is disposed on the second power supply backplane. In this embodiment, the pin element 14 includes a first clamping slot 141, an electrical connection board 142, and a second clamping slot 143. The first clamping slot 141 is provided on the first power supply backplane 11, the second clamping slot 143 is provided on a lower surface of the second power supply backplane 16, and two sides of the electrical connection board 142 are respectively clamped in the first clamping slot 141 and the second clamping slot 143. In other words, a second power supply backplane 16 may be additionally installed on the power supply bus apparatus 1, to electrically connect to another power supply module 2'. The second power supply backplane 16 transmits, by using the pin element 14, electrical energy of the connected power supply module 2' to the first power supply backplane 11 on which the electrical bus insertion group 13 is disposed. In this way, the power supply bus apparatus 1 may be applicable to a computing host requiring high power (for example, a high wattage).

In addition, all power supply modules 2 provide different power wattages. When the power supply bus apparatus 1 is connected to a high-wattage power supply module 2, a size of the electrical bus insertion group 13 is greater than that of the electrical bus insertion group 13 when the power supply bus apparatus 1 is connected to a low-wattage power supply module 2. For example, only structures of a large-sized first base 1311, second base 1321, first plug 1312, and second plug 1322 can bear electrical conduction with a large current amount. For another example, contact areas between the first base 1311 and the first power supply backplane 11 and between the second base 1321 and the first power supply backplane 11 are different due to electricity quantities of different power supply modules 2.

The power supply bus apparatus 1 further includes a frame body 15, and the first power supply backplane 11 is disposed in the frame body 15. The frame body 15 includes a cover plate 151 and two side plates 152. The side plates 152 are respectively disposed on two sides of the first power supply backplane 11, and the cover plate 151 is located above the first power supply backplane 11 and separately connected to the side plates 152.

In the embodiment shown in FIG. 2, corresponding to a setting of the first power supply backplane 11, a length of the upper second power supply backplane 16 is shorter than a length of the lower first power supply backplane 11. According to this structure, the side plates 152 are stepped, and the cover plate 151 is disposed above the first power supply backplane 11 and the second power supply backplane 16, and is connected to the two side plates 152. The cover plate 151 includes a locking hole 1511, and the cover plate 151 is detachably locked to a housing by using a securing member 4 passing through the locking hole 1511. For example, the housing is a box 31 of the server 3. In this embodiment, the cover plate 151 includes an extension portion 1512, the locking hole 1511 is provided on the extension portion 1512, and the extension portion 1512 can cover a part of the box 31, and is locked by using the securing member 4.

In some embodiments, the box 31 of the server 3 may have a sliding groove, the extension portion 1512 may be embedded into the sliding groove, and a hole in communication with the locking hole 1511 is provided on a side wall of the sliding groove. In this way, the cover plate 151 can also be locked to the housing by using the securing member 4, to fasten the power supply bus apparatus 1.

Figure 3:
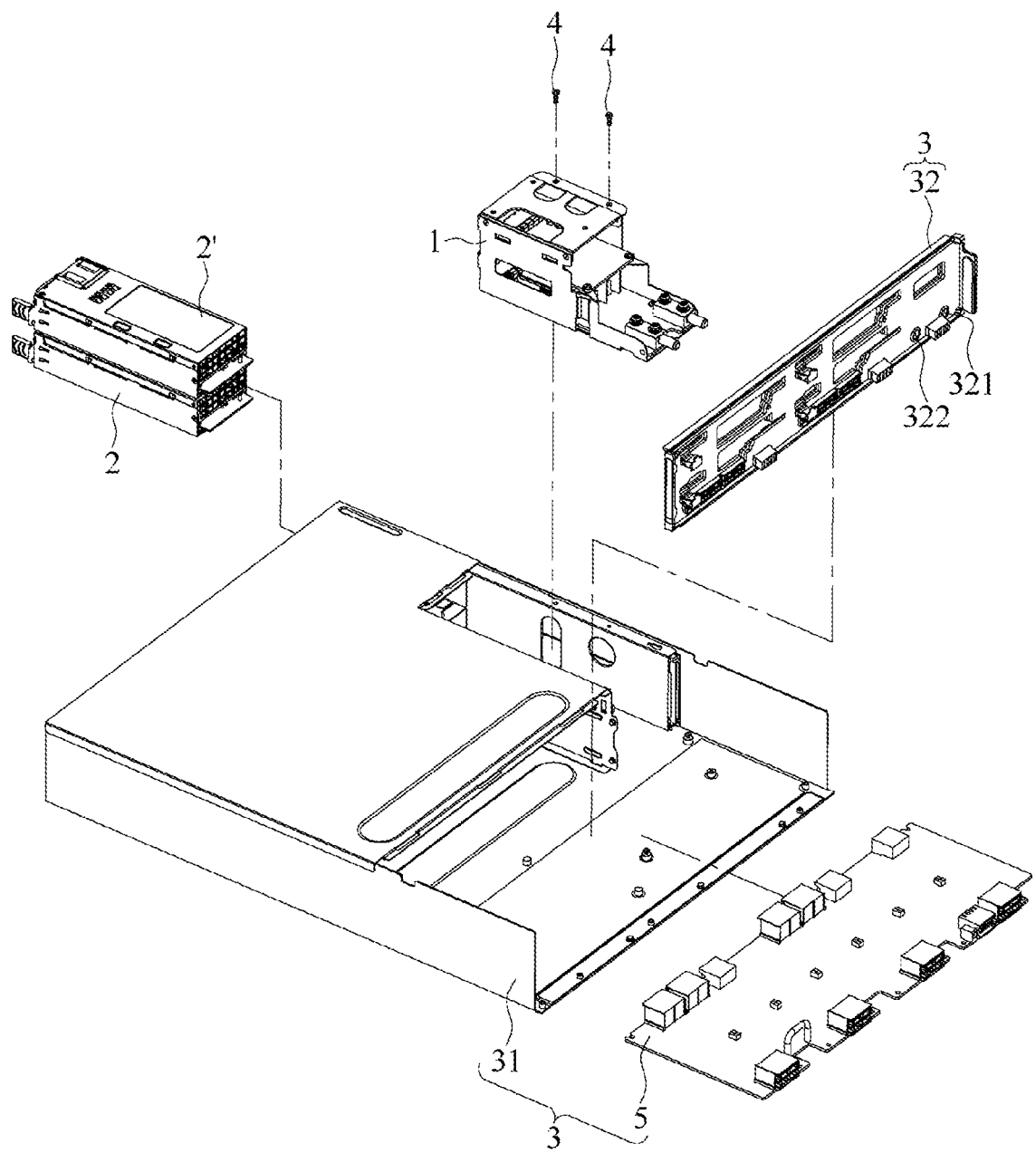
FIG. 3 is a schematic diagram of partial appearance of a server according to an embodiment of the present invention.

FIG. 3 is a schematic diagram of partial appearance of a server 3 according to an embodiment of the present invention. The server 3 includes the foregoing power supply bus apparatus 1 and an electrical relay substrate 32. The electrical relay substrate 32 includes a first insertion hole 321 and a second insertion hole 322, where the first insertion structure 131 is docked with the first insertion hole 321, and the second insertion structure 132 is docked with the second insertion hole 322. For example, the electrical relay substrate 32 is a circuit board, and has the first insertion hole 321 and the second insertion hole 322 that are corresponding to the first insertion structure 131 and the second insertion structure 132.

The electrical relay substrate 32 further has a slot or a port or a combination thereof, so that the electrical relay substrate 32 is inserted into another circuit board. The electrical relay substrate 32 serves as a medium for transmitting electrical energy. Electrical energy provided by the power supply bus apparatus 1 is further transmitted to a circuit board 5 docked with the electrical relay substrate 32 by using the electrical relay substrate 32.

In other words, there may be one or more circuit boards 5 electrically connected to the electrical relay substrate 32. This depends on power of the power supply module 2 designed by a person in the industry, and is not limited in the present invention.

The power supply bus apparatus 1 provided in at least one embodiment of the present invention is installed in the server 3, and has a structure and a design that are convenient for operations and maintenance. Power supply modules 2 with different power and lengths may be docked according to requirements of a system (such as a computing host or the server 3), so that accessory selection for the system is flexible.

In other words, a person in the industry selects an applicable power supply module 2 based on specifications required by the computing host or the server 3. A user may also use a high-wattage power supply module 2 for replacement for an equipped high-order accessory, or vice versa. In this way, manufacturing costs can be reduced.

In addition, in an embodiment of the present invention, the power supply bus apparatus 1 is installed in the server 3, and no wire is used for a docking structure. For the system, wind resistance can be minimized, and heat dissipation can be facilitated.

What is claimed is:

1. A power supply bus apparatus, suitable for electrically connecting to a power supply module and suitable for electrically connecting to an electrical relay substrate, the electrical relay substrate comprising a first insertion hole and a second insertion hole, wherein the power supply bus apparatus comprises:
    a first power supply backplane;
    a first docking structure, disposed on the first power supply backplane and docked with the power supply module; and
    an electrical bus insertion group, disposed on the first power supply backplane and comprising:
        a first insertion structure, extending in parallel with the first power supply backplane and protruding beyond an edge of the first power supply backplane; and
        a second insertion structure, extending in parallel with the first power supply backplane and the first insertion structure, protruding beyond the edge of the first power supply backplane, and having a polarity different from that of the first insertion structure;
    a second power supply backplane docked with a second power supply module; and
    a pin element, two ends thereof being respectively electrically connected to the first power supply backplane and the second power supply backplane;
    wherein the first insertion structure is configured to be docked with the first insertion hole, and the second insertion structure is docked with the second insertion hole;
    wherein the first power supply backplane is configured to provide power from the first power supply module and the second power supply module to a connected computing host via the electric bus insertion group; and
    wherein the second power supply backplane transmits electric energy of the second power supply module to the first power supply backplane via the pin element.

2. The power supply bus apparatus according to claim 1, wherein the pin element comprises a first clamping slot, an electrical connection board, and a second clamping slot, wherein the first clamping slot is provided on the first power supply backplane, the second clamping slot is provided on the second power supply backplane, and two sides of the electrical connection board are respectively clamped in the first clamping slot and the second clamping slot.

3. The power supply bus apparatus according to claim 1, wherein the first insertion structure comprises a first base and a first plug, the first base is disposed on a surface of the first power supply backplane, the first plug is connected to the first base, the second insertion structure comprises a second base and a second plug, and the second plug is connected to the second base.

4. The power supply bus apparatus according to claim 3, wherein the first insertion structure further comprises a first lock member and a second lock member, the first base further comprises a first lock hole, and the second base further comprises a second lock hole, wherein the first lock member passes through the first lock hole to secure the first base on the first power supply backplane, and the second lock member passes through the second lock hole to secure the second base on the first power supply backplane.

5. The power supply bus apparatus according to claim 1, wherein a size of the electrical bus insertion group corresponds to an electricity quantity of the power supply module.

6. The power supply bus apparatus according to claim 1, further comprising a frame body, wherein the first power supply backplane is disposed in the frame body.

7. The power supply bus apparatus according to claim 6, wherein the frame body comprises a cover plate and two side plates, wherein the side plates are respectively disposed on two sides of the first power supply backplane, and the cover plate is located above the first power supply backplane and separately connected to the side plates.

8. The power supply bus apparatus according to claim 7, wherein the cover plate comprises a locking hole, and the cover plate is detachably locked to a housing by using a securing member passing through the locking hole.

9. A server, comprising:
    the power supply bus apparatus according to claim 1; and
    the electrical relay substrate, comprising the first insertion hole and the second insertion hole, wherein the first insertion structure is docked with the first insertion hole, and the second insertion structure is docked with the second insertion hole.

10. The server according to claim 9, wherein the pin element comprises a first clamping slot, an electrical connection board, and a second clamping slot, wherein the first clamping slot is provided on the first power supply backplane, the second clamping slot is provided on the second power supply backplane, and two sides of the electrical connection board are respectively clamped in the first clamping slot and the second clamping slot.

11. The server according to claim 9, wherein the first insertion structure comprises a first base and a first plug, the first base is disposed on a surface of the first power supply backplane, the first plug is connected to the first base, the second insertion structure comprises a second base and a second plug, and the second plug is connected to the second base.

12. The server according to claim 11, wherein the first insertion structure further comprises a first lock member and a second lock member, the first base further comprises a first lock hole, and the second base further comprises a second lock hole, wherein the first lock member passes through the first lock hole to secure the first base on the first power supply backplane, and the second lock member passes through the second lock hole to secure the second base on the first power supply backplane.

13. The server according to claim 9, wherein a size of the electrical bus insertion group corresponds to an electricity quantity of the power supply module.

14. The server according to claim 9, wherein the power supply bus apparatus further comprising a frame body, wherein the first power supply backplane is disposed in the frame body.

15. The server according to claim 14, wherein the frame body comprises a cover plate and two side plates, wherein the side plates are respectively disposed on two sides of the first power supply backplane, and the cover plate is located above the first power supply backplane and separately connected to the side plates.

16. The server according to claim 15, wherein the cover plate comprises a locking hole, and the cover plate is detachably locked to a housing by using a securing member passing through the locking hole.

17. The server according to claim 9, further comprising a circuit board electrically connected to the electrical relay substrate, to receive electrical energy transmitted by the electrical relay substrate.

\* \* \* \* \*